Figure 1:
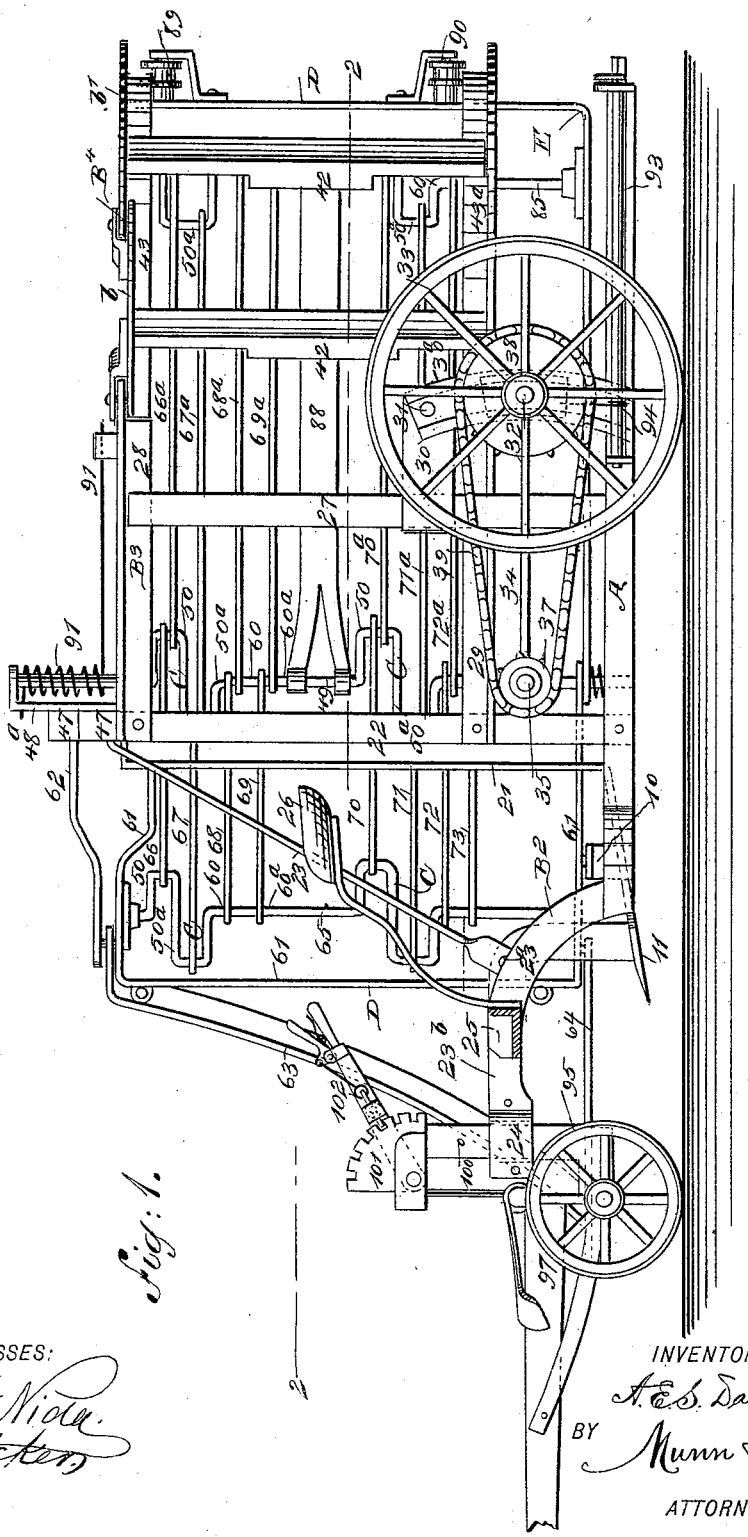

(No Model.) 4 Sheets—Sheet 1.

A. E. S. DANNER.
CORN HARVESTER.

No. 532,646. Patented Jan. 15, 1895.

WITNESSES:
Chas. Nida.
Fred. Peters.

INVENTOR
A. E. S. Danner
BY
Munn & Co
ATTORNEYS.

THE NORRIS PETERS CO., PHOTO-LITHO., WASHINGTON, D. C.

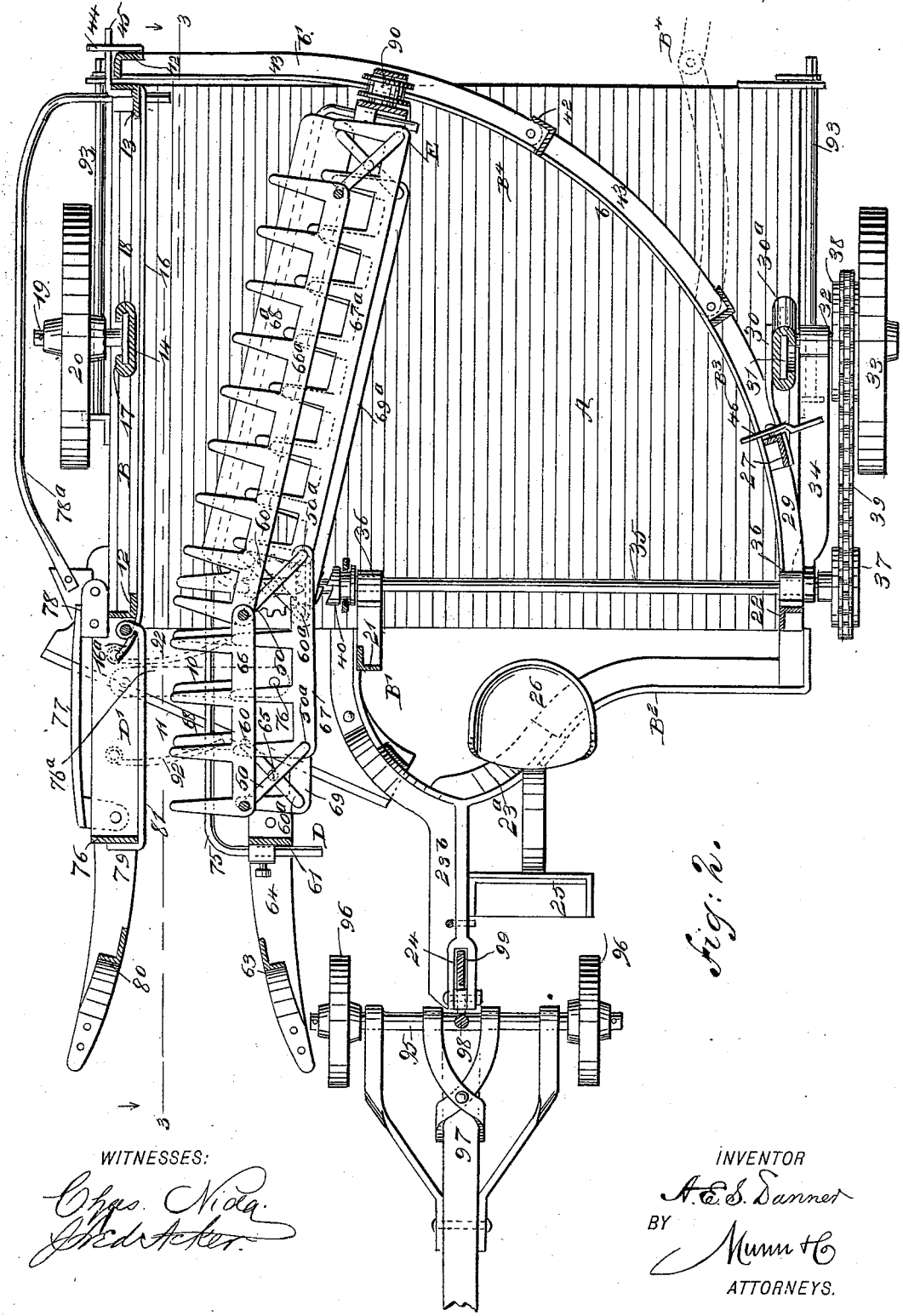

(No Model.) 4 Sheets—Sheet 3.
A. E. S. DANNER.
CORN HARVESTER.
No. 532,646. Patented Jan. 15, 1895.
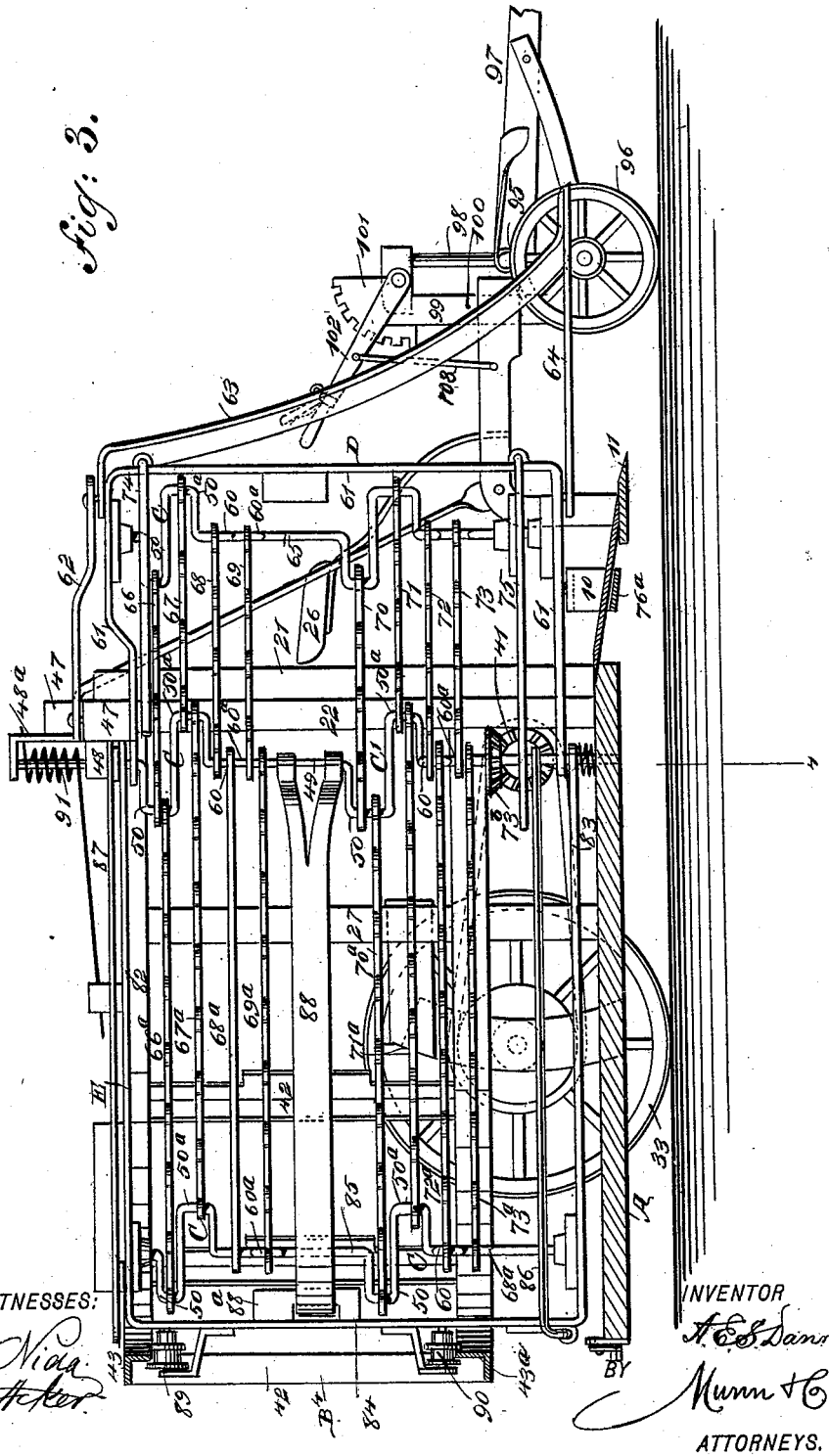
WITNESSES:
INVENTOR
ATTORNEYS.

(No Model.)  
4 Sheets—Sheet 4.
A. E. S. DANNER.
CORN HARVESTER.
No. 532,646.  
Patented Jan. 15, 1895.
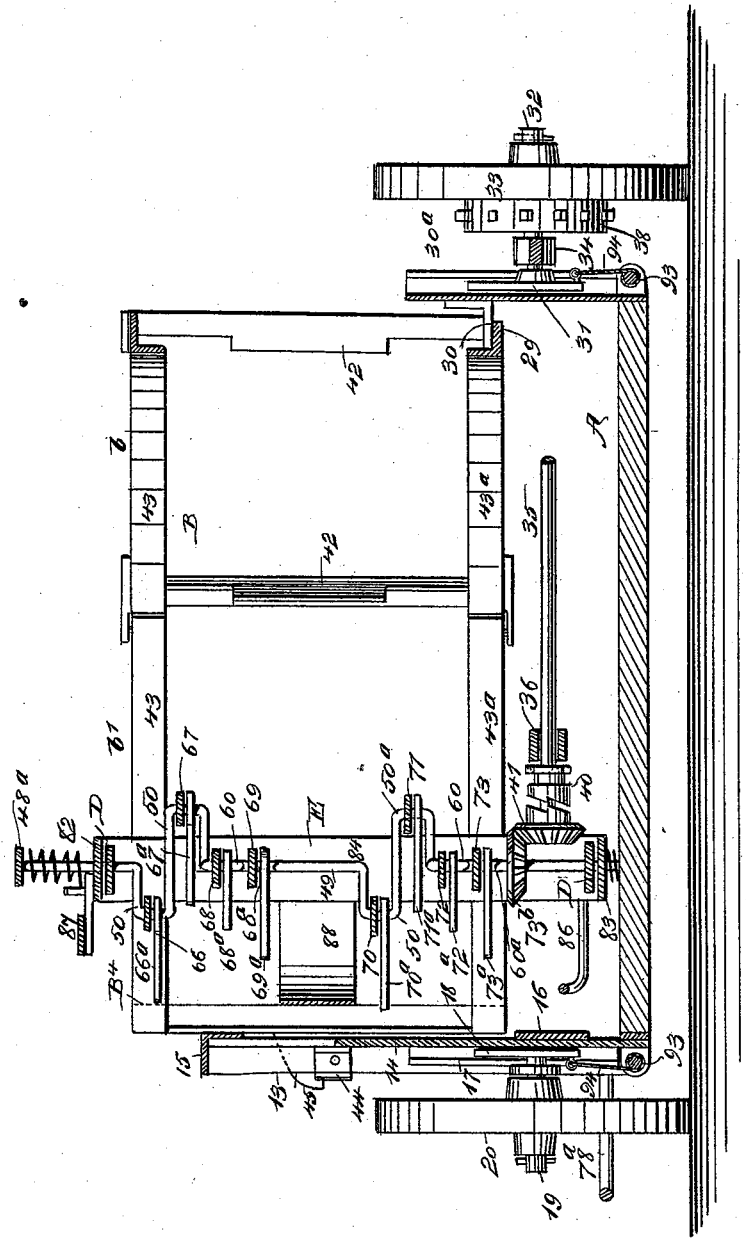
WITNESSES:
INVENTOR  
A. E. S. Danner  
BY  
Munn & Co  
ATTORNEYS.

UNITED STATES PATENT OFFICE.

ALBERT E. S. DANNER, OF NEWTON, KANSAS.

CORN-HARVESTER.

SPECIFICATION forming part of Letters Patent No. 532,646, dated January 15, 1895.

Application filed May 29, 1894. Serial No. 512,862. (No model.)

*To all whom it may concern:*

Be it known that I, ALBERT EDWIN STANTON DANNER, of Newton, in the county of Harvey and State of Kansas, have invented a new and Improved Corn-Harvester, of which the following is a full, clear, and exact description.

My invention relates to an improvement in corn harvesters, and it has for its object to so construct the harvester that the corn stalks will be virtually held in position to be cut by the knife carried by the machine, and held without causing the stalks to drag upon the knife when brought in contact therewith, and whereby the devices employed for holding the corn prior to and virtually while being cut, will also act to feed the cut stalk back into the body of the machine, at which point it will be taken up by a second set of feed devices and carried to the rear, the second set of feed devices being pivoted in such manner that they, together with their frame, may be gradually forced forward against the tension of springs, to provide room on the platform for the corn stalks as they are rearwardly fed.

A further object of the invention is to provide the platform with a surrounding railing, between which the cut stalks will be held upright and in shock form, enabling the operator to expeditiously and conveniently tie the entire bundle into a proper shock, and whereby further the section of the railing at the back may be opened, and when the shock is attached by means of its tie cord or wire, to the ground, for example, as the machine is driven forward the shock will be slid to the ground and remain thereon in an upright position, the only manipulation of the shock that is required at the hands of an attendant being to tie the shock and open the section of railing, which latter may be accomplished by the driver if necessary.

A further object of the invention is to provide a corn harvester of simple, durable and economic construction, and of comparatively light draft, and to construct the receiving section in such manner that it will accommodate itself to crooked as well as to straight rows of corn.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the harvester. Fig. 2 is a horizontal section taken essentially on the line 2—2 of Fig. 1. Fig. 3 is a longitudinal vertical section taken essentially on the line 3—3 of Fig. 2; and Fig. 4 is a vertical transverse section, taken essentially on the line 4—4 of Fig. 3.

In carrying out the invention the platform A, is employed, which is usually made rectangular, but it may be of any desired shape. The said platform at the right-hand side of its forward end is provided with a downwardly and forwardly extending auxiliary platform 10, to which a knife 11, is secured, the said knife being diagonally located with respect to the front edge of the platform, the knife being farthest removed therefrom at its inner end and the said knife is of such a length as to extend a predetermined distance beyond the right-hand side of the platform.

The platform is bounded or surrounded by a railing, one section B of which is located at the right-hand side and parallel with that edge of the platform, the said railing comprising vertical end posts 12 and 13, located respectively at or near the front and rear edges of the platform, and an intermediate post 14, the said posts being connected by the usual top rail 15, shown in Fig. 4, and a wide bottom rail 16, which is curved forwardly and outwardly beyond the front post 12, as shown at 16$^a$ in Fig. 2, this bottom rail serving as a guide for the butt portions of the stalks. The intermediate upright or post 14, has its edges bent outwardly and in direction of one another to form a slide-way 17, in which a block 18 has vertical movement, and the said block is made to carry an axle 19, upon which the right-hand ground supporting wheel 20, is held to revolve.

The front section of the railing is designated as B′, and comprises an upright post 21, located between the center and right-hand side of the platform A, as shown in Figs. 1, 2 and 3, and a second upright post 22, located at the forward left-hand corner of the machine, the inner post 21, being projected forwardly out of alignment with the left-hand post 22. These two posts are connected at the top by a rail of any approved construction, and to the top rail of the railing section B', near the inner post 21, the upper end of the brace 23 is secured, which brace is carried forward and downward to support an extension frame B², which frame consists substantially of a horizontal arched beam 23ª, the main arch portion being at or about the center line of the machine, and from this portion an upwardly and forwardly curved shank section 23ᵇ is projected, being provided at its outer end with a socket 24 to receive the draft device.

A foot platform 25 is projected toward the left-hand side of the machine from the shank 23ᵇ of the frame B², which platform serves as a support for the driver's seat 26, the seat being placed at the left-hand side of the center, since the heaviest portion of the machine, or that carrying the cutter, is at the right hand side.

The left-hand section B³ of the railing is made to curve inwardly and rearwardly over the platform A, and this section may be said to consist of an upright post 27, a top rail 28 and a lower rail 29, the lower rail being located a predetermined distance from the platform. Both of these rails are L-shaped in cross section, the vertical member of the lower rail being the inner member, and it extends upward, while the corresponding member of the upper rail is likewise the inner one but extends downward, as shown in Fig. 1. A bracket 30, is projected horizontally and rearwardly from the post 27 of the rail section B³, and this bracket has secured to it the upper end of a curved slide-way 30ª, the lower end of the slide-way being secured to the platform.

A block 31, is held to slide in the slide-way 30ª, and the said block carries the left-hand axle 32 upon which the left-hand ground wheel 33 is held to revolve; and the axle 32, is passed through a bearing at the rear end of a rod 34, which rod extends forward and terminates at that end in a bearing which receives the outer end of a driving shaft 35, which shaft extends across the platform A, being journaled also in boxes 36, secured to the front posts 21 and 22. The shaft 35, at its outer or left-hand end, is provided with a sprocket pinion 37, which is driven from a sprocket gear 38, secured to the left-hand ground wheel, by a chain belt 39. A beveled gear 41, is loosely mounted upon the inner or right-hand end of the driving shaft 35, which gear is provided with a clutch face, and is driven by engagement with a clutch 40, held to turn with the drive shaft, yet mounted to slide thereon, which clutch may be operated from a lever led to a point within reach of the driver if found necessary.

The railing is completed by the addition of a gate section B⁴, made in two pivotally connected sections b and b'. Each of these sections consists of one or more uprights 42, which carry at the top upper rails 43 and at the bottom the lower rails 43ª, the upper rails 43, constituting continuations of the rails 28 of the fixed left-hand side section B³; and the lower rails 43ª, being continuations of the lower rails 29. The gate section B⁴ of the railing follows the curve of the stationary left-hand section B³, crosses the platform at the rear and engages with the right-hand stationary section B of the railing, being locked thereto through the medium, for example, of a latch 44, carried by the railing section B⁴, engaging with the keeper 45 located upon the right-hand section B of the railing. When the gate section of the railing is open, almost the entire rear portion of the platform is disclosed, the gate section occupying practically the position shown in dotted lines in Fig. 2. A latch 46, is preferably secured upon the left-hand upright post 27, adapted for a purpose to be hereinafter set forth.

At the right-hand side of the machine, upon the upper portion of the front railing section B', a beam 47, is secured, which beam is preferably of step construction, and is provided upon its rear face with a bearing 48, and in this bearing, and likewise in a similar bearing located upon the platform A a shaft 49, is journaled, the shaft being made to extend above the bearing 48, and it is capped by a suitable bracket 48ª. This shaft 49, is provided at each side of its center with a series of crank arms, the series being respectively designated as C and C'. Each series of crank arms comprises two sets of arms, the arms of each set extending in directly opposite directions, and the arms of one set are arranged at right angles to the arms of the other set, as illustrated in Fig. 2. The crank arms of the upper set of each series are designated respectively as 50 and 50ª, and the crank arms of the lower set of each series as 60 and 60ª. The space between the ends of the shaft and the series of crank arms, and likewise the space between the two series, are straight. An extension frame D, extends forwardly from the said crank shaft 49, and this frame usually consists of a strip or strips of metal 61, bent upon themselves to form an upper and a lower horizontal stretch and a front vertical stretch, as shown in Fig. 3, the upper and lower stretches being pivoted upon the upper and lower sections of the said crank shaft 49. A bracket 62, is pivotally connected with the lower step of the beam 47, and likewise with the upper or cap section of the guide arm 63, the said guide arm being pivoted likewise to the upper stretch of the extension frame D.

The guide arm 63 extends downwardly and at the same time in a forwardly direction, and in direction of the left-hand side of the machine, the lower end of the guide arm being attached to a guide finger 64, the said guide finger being inclined or beveled upon its inner face, and it is adapted to direct the stalks of corn to the knife 11. The guide finger 64 is either pivotally or securely fastened to the bottom stretch of the frame D.

A second crank shaft 65, the duplicate of the aforesaid crank shaft 49, is journaled in the extension frame D, the shaft 49 being in what may be termed the body frame or portion of the machine, and the said crank shaft 65, is provided with the same number of crank arms located in the same position as the crank arms on the shaft 49; and the crank arms of the shaft 65 are correspondingly numbered.

The upper set of crank arms of the two shafts 49 and 65, are connected by horizontally located rakes, adapted as feeds for the stalks, the object of these rakes being to carry the stalks in a rearwardly direction, or upon the body portion of the machine. The upper rake is designated as 66, and it is pivotally connected with the crank arms 50. The next lower rake is designated as 67, and is pivotally connected with the crank arms $50^a$, the two lower rakes 68 and 69, being made to connect respectively the crank arms 60 and $60^a$ of the said shafts. The rake feeds connecting the lower crank arms of the said shafts 49 and 65, are designated respectively as 70, 71, 72 and 73. Both of these crank shafts are driven through the medium of the crank shaft 49, and this is accomplished by causing the gear 41 of the driving shaft 35 to be placed in driving connection with a gear $73^b$ located upon the said shaft 49 as illustrated in Figs. 3 and 4; and it is evident that when the said shafts are revolved the rake feed belonging to the upper series of crank arms will likewise be in an outer position and one belonging to the lower series of crank arms will likewise be in an outer position, or a position to engage with the corn stalk and carry it rearward, the other rakes being in varying positions relative to the forward and rearward movement, as is shown in Fig. 2.

In order that the stalks shall not stick between the teeth of the feeding devices or rakes in such manner that the stalks shall be carried in direction of the left-hand side of the machine, an upper guide 74 and a lower guide 75 are provided, adjustably secured to the forward portion of the extension frame D, and carried over the right-hand face of said frame, extending in direction of the right-hand side of the machine a sufficient distance to bring the guides a slight distance back of the extremities of the teeth of the rakes that are in their full outer position, as shown in Fig. 2.

An extension frame D', substantially the duplicate of the frame D, is located opposite the said frame D upon the right-hand portion of the main frame or body of the machine at the front, and this frame consists of a band or strip of metal bent upon itself to form an upper, a lower and a front stretch, and is pivotally connected to the right-hand railing section B, and the two frames D and D' are connected by a tie bar $76^a$, which may be, and preferably is, passed through a transverse recess made in the platform 10 carrying the knife, or the said frame tie bar may be passed beneath the said platform.

The frame D' is strengthened through the medium of a brace bar 77, pivotally attached to the said frame, and to a bracket 78, projected from the front right-hand portion of the platform A, the said bracket having likewise attached to it one end of a guard rail $78^a$, which is bowed outward and carried outside of the right-hand supporting wheel 20, being attached at its rear end either to the rear end of the railing section B, or to the inner portion of the platform. A guard finger 79, oppositely curved to the guard finger 64, and located directly opposite the latter guard finger, is attached in any approved manner to the forward bottom portion of the right-hand extension frame D', the said guard finger having attached to its forward end a guide arm 80, curved in a reverse manner to the opposing guide arm 63, the said right-hand guide arm 80, being attached at its upper end to the upper portion of the extension frame D'. Both of these frames extend over the platform carrying the knife 11, while the guide or guard fingers 64 and 79 are well in advance of the said knife; and a guide plate 81, is horizontally located between the upper and the lower portions of the right hand extension frame D', being secured to the front bar of the said frame and hinged to the main frame at its rear end, the guide plate 81 of the extension frame being above the guide plate 16 forming a portion of the right-hand railing section B.

A gathering or shocker frame E, is adapted to travel over the table, and to receive the stalks from the sets of feed rakes located in the left-hand extension frame D. This inner shocker frame comprises an upper horizontal bar 82, a rear bar 84 and a bottom bar 83, the upper and the lower bars at their forward ends being pivoted upon the main crank 49, as shown best in Fig. 3. The said shocker frame E, is provided with a crank shaft 85 near its rear end, the duplicate in every particular of the crank shafts 49 and 65, and its crank arms are correspondingly designated.

The crank arms of the rear crank shaft 85, and the crank arms of the main crank shaft 49 are connected in like manner as the shaft 49 is connected with the forward shaft 65 by a series of feed rakes, and the said feed rakes are designated as $66^a$, $67^a$, $68^a$ and $69^a$ for the upper series, while the rakes of the lower series are designated as $70^a$, $71^a$, $72^a$ and $73^a$. These rakes belonging to the main frame are consequently longer than those in the extension frame, and are correspondingly located, but preferably the third rake of each series in the main swinging or shocker frame is preferably without teeth, but is made plain and of a width corresponding to the other rakes. These parts, namely, the parts $68^a$ and $72^a$, have been heretofore generally alluded to as constituting one of the series of rakes, but in reality they are not rakes, being adapted to convey the corn stalks fed rearward by the toothed feed devices from the said teeth in such manner as to prevent a clogging of the latter. In addition to these feed rakes 68ª and 72ª, delivery guides are also employed, one of said guides 86 being in the nature of a bar, and it is adjustably attached to the lower portion of the swinging or shocker frame at the back, and extends well forward beneath the lower series of feeding devices, a second guide 87, being located in corresponding manner at the top of the said shocker frame, as shown best in Fig. 4, the said upper guide being preferably in the nature of a bar, while a third and intermediate guide 88, is located between the two series of feeding devices, the said guide being hinged or pivoted upon the main crank shaft 49, and it is passed through a latch 88ª at the rear portion of the said frame. This guide is made adjustable at its rear end in order that it may be carried outward as far as may be desired to clear the lower feed rakes especially from clogging engagement with whatever grain they are called upon to feed, and the guide 88 may be held in any position by means of a set screw or its equivalent.

Upon the rear end of the shocker frame two flanged friction rollers 89 and 90, are suitably mounted, one of these rollers being adapted to travel upon the flanged portion of the lower tie bars 29 and 43ª of the circular sections B³ and B⁴ of the railing, surrounding the platform, while the upper roller 89, is made to travel in engagement with the downwardly extending flange of the corresponding upper tie bars or plates 28 and 43 of the said circular sections of the railing, as shown in Figs. 1, 2 and 3. The shocker frame is spring-controlled, a spring 91 being coiled around each end of the main crank shaft 49, one end of the spring being attached to or having bearing upon a fixed support, the other end of the spring being connected with the said shocker frame, and the tendency of these springs is to maintain the shocker frame in alignment with the inner or left-hand extension frame B; but as the corn stalks are fed rearward upon the table, and accumulate thereon, the shocker frame will be moved toward the left along the curved railing, as shown in Fig. 2, until when all the platform has been completely filled the shocker frame will have faced practically to the front of the machine, and a keeper on the said frame will then be engaged by the latch 46 located on the stationary left-hand section of the section B³ of the railing, the shocker frame being then held stationary. The shock may now be bound by an attendant, and a rope may be passed around the shock and having stakes or pegs at each end, and the said stakes or pegs are driven into the ground at the back of the machine. The gate sections of the railing are now opened and the machine is driven forward, the platform having been given preferably a downward and rearward inclination, whereupon the platform will be drawn from under the shock and the shock will fall to the ground, remaining in an upright position. Thus it will be observed that every operation of harvesting is automatic except those of binding and discharging the shocks.

If the incline 10 of the platform connected with the knife should retard the movement of the butt ends of the stalks, the upper portions of the stalks may be correspondingly retarded by extending springs 92, shown in dotted lines in Fig. 2, over the channel-way through which the stalks pass to the platform A.

The platform of the machine is raised and lowered preferably by journaling at each side of the platform a shaft 93, which may be revolved by means of a crank, the said shafts being connected with the blocks by which the axles are carried, by chains or cables 94, whereupon by turning the shafts 93 in one direction the chains or cables will be wound upon the shafts and the platform will be proportionately raised by the slide-ways moving upward on the blocks. The draft device consists of a forward, preferably arched axle 95, which is quite short and is located at the left-hand side of the receiving portion of the machine, and is provided with small ground wheels 96. The axle has connected with it a tongue or pole 97, and a standard 98, is projected upward from the axle, which supports a bracket 99, provided with a series of apertures 100. The bracket is passed through the eye 24 in the draft frame B² of the machine, and is adjustably connected therewith through the medium of a bolt being passed through the said eye and through a suitable aperture in the bracket. At the upper end of the bracket a rack 101, is located, adapted to be engaged by a thumb latch of a lever 102, which is connected by a link 103, with the draft frame B² of the machine. Thus by removing the bolt from the bracket 99 and the draft frame, and operating the lever 102, the front of the machine may be raised or lowered as required and held in that position.

It is evident that since the extension frames D and D' are connected, and have united swinging movement upon their support, the guide or guard fingers 79 and 64 will automatically accommodate themselves to any irregularity of the row or rows of corn being operated upon, and that the corn will be received by the front series of feeding devices prior to the stalks reaching the knife and will be held to the knife, enabling the latter to cut to the best advantage; and that as the corn stalks are fed upon the platform by the front series of feeding devices or rakes, the stalks will be received by the rear series carried by the shocker frame and will be distributed along the rear portion of the platform.

It will be further understood that the movement of the rakes or feed devices will be substantially at the same rate of speed as that of the machine in moving over the ground, so that the stalks will not pull against the knife while being cut.

I desire it also to be understood that instead of having the knife 11 fixed, the said knife may be of the reciprocating type, and that instead of rakes being employed as feed devices they may be substituted by endless chains carrying projecting fingers.

Having thus described my invention, I claim as new and desire to secure by Letters Patent—

1. In a corn harvester, the combination with a platform having a railing, a section of the railing forming an arc of a circle, of a gathering or shocker frame having its forward end pivoted and its rear end traveling on the curved section of the railing, substantially as described.

2. In a corn harvester, the combination with a platform provided with a railing composed of hinged sections forming the arc of a circle, of a gathering or shocker frame having its forward end pivoted and its free end engaging and traveling on the railing, substantially as described.

3. In a corn harvester, the combination with a platform provided with a railing composed of hinged sections having flanged top and bottom rails and forming an arc of a circle, of a gathering or shocker frame having its forward end pivoted and provided at its free end with flanged rollers traveling on the rails of the railing, substantially as described.

4. In a corn harvester, a platform provided with a railing substantially surrounding the same, a section of the railing forming an arc of a circle, a frame pivotally supported upon the platform, its rear end being capable of traveling upon the central section of the railing, horizontal feed devices carried by the said swinging frame, and guide devices carried by the said swinging frame and located at the forward end of the platform, whereby material is fed rearwardly upon the platform and at the same time the swinging frame will travel in a forwardly direction, providing space for the material and holding the same in upright position, substantially as shown and described.

5. In a corn harvester, the combination, with a platform, guides located at the forward portion of the platform and adapted to receive the stalks, a feed mechanism carried by one of the guides, and a knife located beneath the guides and carried by the platform, of a railing substantially surrounding the platform, one section of which forms an arc of a circle and is provided with tracks, a swinging frame pivotally supported at the forward end of the platform, its free end being supported by the said tracks, and feed devices carried by the swinging frame and operating simultaneously with and acting in conjunction with the feed mechanism of the forward guide, as and for the purpose set forth.

6. In a corn harvester, the combination, with a platform, a knife carried by the platform, guides located at the forward end of the platform and extending over and beyond the knife, the said guides being adapted to receive between them the stalks, and a feed mechanism carried by one of the guides and extending beyond the cutting edge of the knife, of a railing substantially surrounding the platform, one section of which forms an arc of a circle, the said section extending from the rear to the front, tracks carried by the said segmental section of the railing, a swinging frame adapted to travel over the platform, having pivotal connection therewith at its forward end and provided with a feed mechanism corresponding to and operating simultaneously with the feed mechanism of the guide, the two feed mechanisms operating simultaneously in conjunction, means, substantially as described, for supporting the free end of the swinging frame upon the said track, and guards located upon the section of the forward guide carrying the feed mechanism, and likewise upon the swinging frame, the said frame being spring-controlled, as and for the purpose specified.

7. In a corn harvester, the combination, with a platform, a knife carried by the platform, guides located at the forward end of the platform and extending over and beyond the knife, the said guides being adapted to receive between them the stalks, and a feed mechanism carried by one of the guides and extending beyond the cutting edge of the knife, of a railing substantially surrounding the platform, one section of which forms an arc of a circle, the said curved section extending from the rear to the front, tracks carried by the said curved section of the railing, a swinging frame adapted to travel over the platform, having pivotal connection therewith at its forward end and provided with a feed mechanism corresponding to and operating simultaneously with the feed mechanism of the guide, the two feed mechanisms operating substantially in conjunction, means, substantially as described, for supporting the free end of the swinging frame upon the said track, guards located upon the section of the forward guide carrying the feed mechanism and likewise upon the swinging frame, the said frame being spring-controlled, gates formed in the curved section of the railing, and means, substantially as shown and described, for locking the swinging frame in a forward position, as and for the purpose set forth.

8. In a corn harvester, the combination, with a wheel supported platform, a knife carried thereby, and guide frames spaced a predetermined distance apart, connected at their inner ends with the platform and extending forwardly over and beyond the knife, of a railing substantially surrounding the platform, a section of which forms an arc of a circle and is provided with tracks, a spring-controlled swinging frame pivotally connected at its forward end with the forward portion of the platform, a feed mechanism located in one of the guides and likewise in the swinging frame, means, substantially as shown and described, for operating the said feed mechanism, the mechanism being adapted to carry the stalks engaged therewith rearwardly upon the platform, the swinging frame yielding in a forwardly direction to accommodate the stalks, and gates formed in a portion of the curved section of the railing, the free end of the swinging frame being made to travel upon said railing, as and for the purpose set forth.

9. In a corn harvester, the combination with a platform and a cutter carried thereby, of pivoted and forwardly projecting frames, guide arms secured to the said frames, horizontally reciprocating feed rakes carried by one of the forwardly projecting frames, and a pivoted shocker frame in rear of the said feed rakes and provided with horizontally reciprocating feed rakes, substantially as described.

10. In a corn harvester, the combination with a platform and cutter carried thereby, of pivoted and forwardly projecting frames, guide arms secured to the said frames, horizontally reciprocating feed rakes carried by one of the said frames, a pivoted and spring pressed frame at the rear of one of the forwardly projecting frames, and horizontally reciprocating feed rakes mounted in said pivoted frame, substantially as described.

11. In a corn harvester, the combination with a supporting frame, of a vertical crank shaft mounted in said frame, a forwardly projecting frame pivoted on said crank shaft, a vertical crank shaft in the forward end of the said frame, a rearwardly extending frame pivoted on the first named crank shaft, a vertical crank shaft in the free end of the said rearwardly extending frame, toothed bars connected to the cranks of the several shafts, and means for operating the first named crank shaft, substantially as described.

12. In a corn harvester, the combination with the platform, and a vertical crank shaft, of a gathering or shocker frame pivoted on the said crank shaft, a crank shaft mounted in the free end of the said frame, toothed bars mounted on the cranks of the said shafts, a guide bar having one end pivoted upon the first named crank shaft, and its other end adjustably secured to the frame, and means for operating the first named crank shaft, substantially as described.

ALBERT E. S. DANNER.

Witnesses:
L. G. HARLAN,
S. T. DANNER.